US 8,245,265 B2

(12) United States Patent
Yoon et al.

(10) Patent No.: US 8,245,265 B2
(45) Date of Patent: Aug. 14, 2012

(54) METHOD AND APPARATUS FOR CONVERTING DIGITAL CONTENT METADATA AND NETWORK SYSTEM USING THE SAME

(75) Inventors: Hyun-sik Yoon, Seoul (KR); Hyun-gyoo Yook, Seoul (KR); Sae-rin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1057 days.

(21) Appl. No.: 10/824,435

(22) Filed: Apr. 15, 2004

(65) Prior Publication Data
US 2004/0208480 A1    Oct. 21, 2004

(30) Foreign Application Priority Data

Apr. 18, 2003   (KR) .................. 10-2003-0024806

(51) Int. Cl.
*H04N 7/173* (2006.01)
(52) U.S. Cl. .......... 725/132; 725/140; 725/152; 386/69; 386/70
(58) Field of Classification Search .................. None
See application file for complete search history.

(56) References Cited

U.S. PATENT DOCUMENTS

| | | | |
|---|---|---|---|
| 2002/0107973 A1* | 8/2002 | Lennon et al. | 709/231 |
| 2002/0199188 A1* | 12/2002 | Sie et al. | 725/35 |
| 2003/0061206 A1 | 3/2003 | Qian | |
| 2004/0193609 A1* | 9/2004 | Phan et al. | 707/10 |

FOREIGN PATENT DOCUMENTS

| | | |
|---|---|---|
| EP | 1 073 223 A1 | 1/2001 |
| EP | 1 244 309 A1 | 9/2002 |
| JP | 2000-224257 A | 8/2000 |
| JP | 2000-253367 A | 9/2000 |
| JP | 2002-112208 | 4/2002 |
| JP | 2002-344935 A | 11/2002 |
| KR | 2002-0063830 A | 8/2002 |
| KR | 2003-0022286 A | 3/2003 |
| KR | 2003-0024806 A | 3/2003 |
| WO | 01/06688 A1 | 1/2001 |
| WO | 02/054769 A1 | 7/2002 |
| WO | WO 02/078347 A1 | 10/2002 |

OTHER PUBLICATIONS

Kinno A et al., "Environment adaptive xml transformation and its application to content delivery" Applications and the Internet, 2003. Proceedings. 2003 Symposium on Jan. 27-31, 2003, Piscataway, NJ, USA IEEE, Jan. 27, 2003, pp. 31-38, XP010628985.

* cited by examiner

*Primary Examiner* — Joseph P Hirl
*Assistant Examiner* — Fred Peng
(74) *Attorney, Agent, or Firm* — Sughrue Mion, PLLC

(57) ABSTRACT

A method and apparatus for converting digital content metadata received external to a network into digital content metadata peculiar to the network and a network system using the same. Particularly, the present invention is directed to a method and apparatus for converting TV-Anytime metadata into UPnP CDS metadata and a network system using the same. The apparatus for converting digital content metadata according to the present invention includes a mapping module for converting the received external digital content metadata into the digital content metadata peculiar to the network, and a search module for locating a method of accessing a program in a predetermined manner using the unique identifier assigned to each program in the received external digital content metadata.

17 Claims, 10 Drawing Sheets

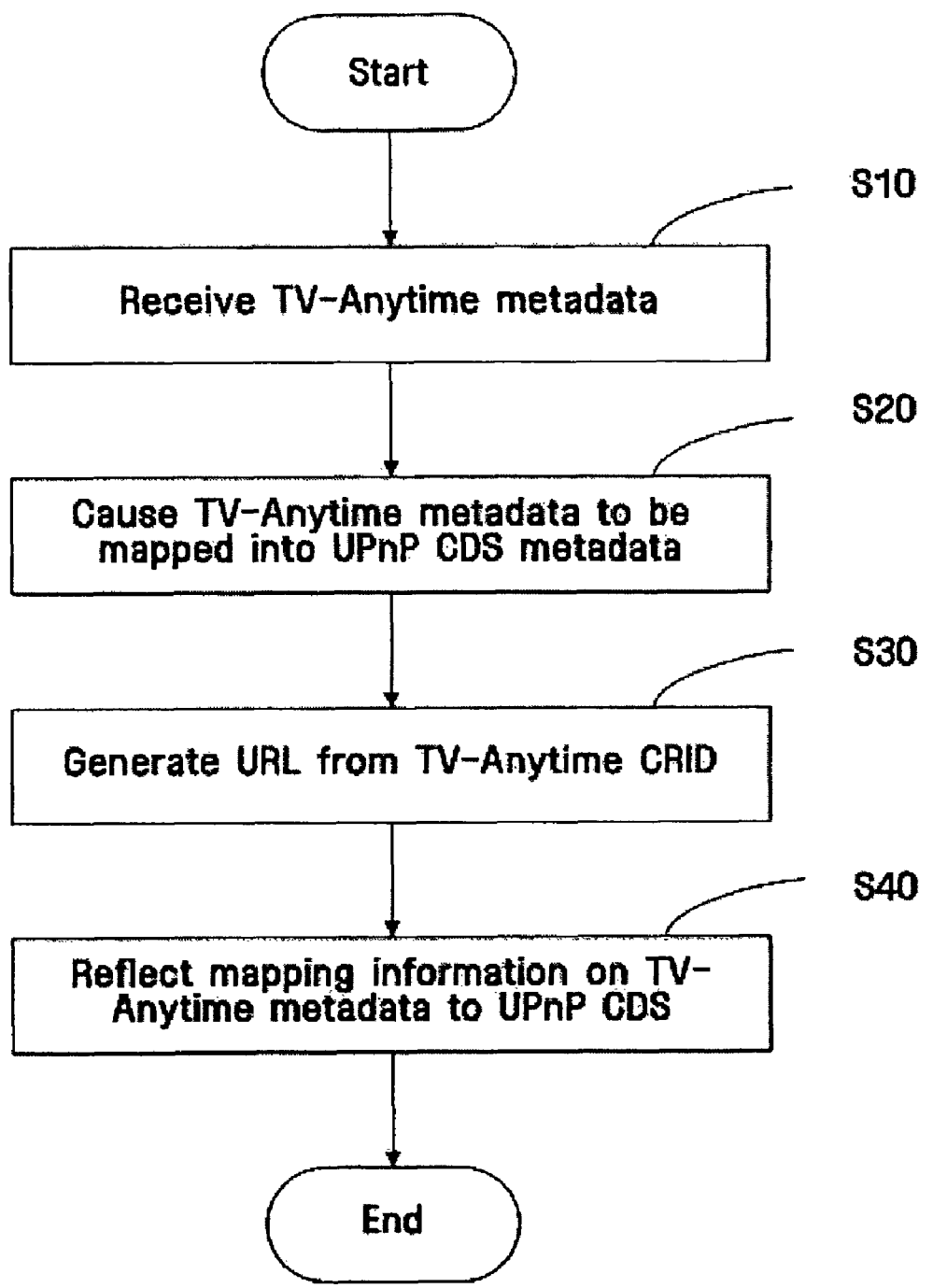

METHOD AND APPARATUS FOR CONVERTING DIGITAL CONTENT METADATA AND NETWORK SYSTEM USING THE SAME

This application claims the priority of Korean Patent Application No. 10-2003-0024806 filed on Apr. 18, 2003 in the Korean Intellectual Property Office, the disclosure of which is incorporated herein in its entirety by reference.

BACKGROUND OF THE INVENTION

1. Field of the Invention

The present invention relates to a method and apparatus for converting digital content metadata received external to a network into digital content metadata peculiar to the network and a network system using the same. Particularly, the present invention relates to a method and apparatus for allowing TV-Anytime information to be used in a Universal Plug and Play (UPnP) content directory service (CDS) and a network system using the same. More particularly, the present invention relates to a method and apparatus for converting digital content metadata for allowing UPnP devices to utilize TV-Anytime information through a UPnP CDS and a network system using the same.

2. Description of the Related Art

If a viewer wishes to watch a desired broadcast program through a television (TV), the viewer should be able to watch a desired TV program without regard to a broadcast schedule. Presently, it is possible to overcome some of the time limitations by using the reservation recording function of a video cassette recorder (VCR). Such a case, however, is inconvenient in that the viewer must check the program schedule and make reservations for the desired programs one by one. With the development of digital technologies such as moving picture compression technology including MPEG (Moving Picture Experts Group), large-capacity HDD (Hard Disk Drive), video editing technology and the Internet, a personal video recorder (PVR) for home use, which has a large-capacity storage device, has recently been brought onto the market.

A user of the PVR can watch a desired TV program at a desired time and receive a variety of additional services. The PVR is a system for allowing a broadcast program input to a computer through various channels such as cable, satellite broadcasting and digital TV to be stored in the HDD of a computer by means of moving picture compression technology. The PVR has convenient search and play functions, excellent sound/image quality, and an ability to simultaneously perform the play and record functions, which cannot be obtained with audio and video cassette recorders. The PVR includes a TV tuner, operating software, a modem and a hard drive, and thus, a user can select and record a desired program at a desired time through the Internet by using a remote control.

To accomplish these services, content producers, communication and broadcasting companies, service providers, and electric appliance companies gathered and established the civil standard organization called TV-Anytime forum on September 1999. The TV-Anytime forum is comprised of several working groups for business models, system technology, metadata, content referencing, and content protection/management, to perform the standardization. As of June 2002, "1st Draft of Metadata Specification SP003v1.3" was announced. More detailed information is available from the web site, www.tv-anytime.org.

The Universal Plug & Play (UPnP) forum was established on Oct. 18, 1999 and has defined "UPnP device and service descriptions" (originally called device control protocols or DCPs) according to a common device architecture contributed by Microsoft. The goals of the UPnP forum are to enable the emergence of easily connected devices and to simplify the implementation of networks in the home and corporate environments. The UPnP forum achieves these goals by defining and publishing UPnP device and service descriptions built on open Internet-based communication standards.

The UPnP forum's web site, www.upnp.org, is a central repository for schemas that have been developed and standardized by the UPnP forum. In addition, the web site contains the device architecture document, templates for device and service descriptions, and guidelines for device and service description design. Through the use of UPnP, devices can be automatically and dynamically connected to a network, secure an Internet Protocol (IP) address, deliver functions, and check the presence and function of other devices. Thus, a genuine network with a zero configuration can be implemented. Devices further strengthen a peer-to-peer networking function by continuously communicating directly with the other devices.

The coverage of UPnP is very broad to such an extent that the UPnP can be applied to new fields as well as existing fields such as home automation, printing and imaging, audio/video entertainment, kitchenware, and automobile networks. Further, since UPnP uses standard TCP/IP (Transmission Control Protocol/Internet Protocol), it can be freely integrated into existing networks. UPnP supports communication between a control point and a device. Network media, TCP/IP protocol and HTTP (HyperText Transfer Protocol) provide basic network connectivity and addressing schemes. On the basis of the open standard Internet-based protocol, UPnP defines a series of HTTP servers for processing search, description, control, event, and presentation. UPnP-based devices can receive a variety of content through UPnP CDS. The UPnP CDS stores information about content stored in other locations as well as in itself, so that they can easily use relevant content.

FIG. 1 is a view showing an environment where TV-Anytime and UPnP CDS are used.

Devices shown in FIG. 1 include a device 10 with only a UPnP CDS 11, a device 20 with only a module 21 for processing TV-Anytime metadata, and a device 30 with both a module 31 for processing TV-Anytime metadata and a UPnP CDS 32. These devices can receive content through the Internet, public broadcasting, cable broadcasting, satellite broadcasting or the like.

FIGS. 2a and 2b are diagrams schematically showing the hierarchical structure of metadata for current UPnP CDS.

Data stored by UPnP CDS are roughly classified into two metadata classes, i.e. an item class 110 and a container class 120. In general, the item class 110 represents multimedia data existing in a single unit, e.g. a video file or a music file, and the container class 120 is a unit including the items and can represent a folder album etc. All these classes are inherited from a class called an object 100.

The item class 110 includes a plurality of subclasses that includes a videoItem class 112 for representing image data. The videoItem class 112 also includes a plurality of subclasses that includes a movie class 114 for representing video data where images are mainly contained, a videoBroadcast class 116 for representing broadcasting data, and the like.

The container class 120 includes a subclass such as the genre class 122 for representing a genre, which in turn includes its own subclass such as the movieGenre class 124 that is a collection of items where movies are collected according to genres.

Each class of UPnP CDS has a property for representing its own characteristics, which is shown in Table 1. The subclasses inherit the properties of the upper classes in the same way as the concept of object orientation.

TABLE 1

| Class name | Properties |
| --- | --- |
| Object | id, parentID, title, creator, res, class, restricted, writeStatus |
| Item | refID |
| VideoItem | genre, longDescription, producer, rating, actor, director, description, publisher, language, relation |
| Movie | storageMedium, DVDRegionCode, channelName, scheduledStartTime, scheduledEndTime |
| VideoBroadcast | icon, region, channelNr |
| Container | childCount, createClass, searchClass, searchable |

A UPnP CDS shows its own metadata in an XML format when a UPnP device requests the metadata. An example of item information, which the UPnP CDS returns to the UPnP device using UPnP CDS, is given as follows:

```
<DIDL-Lite xmlns:dc="http://purl.org/dc/elements/1.1/"
    xmlns:upnp="urn:schemas-upnp-org:metadata-1-0/upnp/"
    xmlns="urn:schemas-upnp-org:metadata-1-0/DIDL-Lite/">
    <item id="10" parentID="4" restricted="false">
        <dc:title>Desert Rose</dc:title>
        <dc:creator>Sting</dc:creator>
        <upnp:class>object.item.audioItem.musicTrack</upnp:class>
        <res         protocolInfo="http-get:*:audio/x-ms-
wma:*"size="50000">
            http://10.0.0.1/getcontent.asp?id=10
        </res>
    </item>
</DIDL-Lite>
```

FIG. 3 shows the configuration of TV-Anytime metadata.

TV-Anytime metadata 200 are expressed in an XML format and have an element called <TVAMain> in its top layer. Further, below this element, there exists information 210 on a program, information 220 on program location or service, information 230 on a consumer or user, information 240 on segments corresponding to pieces of the program, and the like. Below the program information 210, there exists information 211 on the program itself, information 212 on a group corresponding to a unit for binding a plurality of programs, information 213 on people (e.g., actors or directors) or organization related to the program, and information 214 on program reviews. Below the program location or service information 220, there exists information 221 on the service, information 222 on the actual location of the program, and the like. Below the consumer information 230, there exists information 231 on consumer's preferences or tastes, information 232 on the consumer's access records, and the like. Finally, information 241 on the segments and the like are arranged below the segmentation information 240.

UPnP uses UPnP CDS so that a common interface is provided when UPnP devices intend to obtain content information. Further, the UPnP devices use content metadata obtained from UPnP CDS in order to provide the consumer with services. The metadata forming UPnP CDS represents information on the multimedia data stored in UPnP devices 10 and 30. A process through which UPnP CDS obtains the multimedia data information is not clearly stated in the UPnP device and service descriptions. TV-Anytime defines a standard for service, technology and tools for use in a multimedia platform based on the storage media used. Content dealt with in TV-Anytime include radio programs, audio tracks, MPEG4 objects, images and music as well as TV broadcasting programs. TV-Anytime allows various services to be provided to a consumer using various metadata such as the title and synopsis of a program.

The metadata of TV-Anytime are delivered to the devices 20 and 30 through broadcast signals or via the Internet. The devices process and use the received metadata to generate an electronic program guide (EPG). To access the program that the consumer selects while viewing the EPG, the devices find out the location of a selected program through a method known as "location resolution" using a unique identifier, which is called a Content Reference Identifier (CRID) which is assigned to each selected program, and obtains the broadcast content from the location information so that the consumer can watch or record the selected program.

However, TV-Anytime and UPnP CDS, which provide the consumer with metadata, manage metadata that are not compatible with each other. Such a structure has the following problems. First, since UPnP devices capable of accessing only UPnP CDS cannot use the metadata provided by TV-Anytime, the needs of a consumer who wants to access all the metadata cannot be satisfied. Further, if the devices needed for content metadata should support UPnP CDS and TV-Anytime in order to solve this problem, a heavy burden will be imposed on the devices.

UPnP CDS provides a movie class 114, a videoBroadcast class 116 and the like to represent broadcast content, but the properties of these classes are very weak. Thus, only very limited information is delivered to a user. Due to these problems, devices are divided into a device supporting TV-Anytime and a device supporting UPnP CDS. Additionally, there exist devices that support both TV-Anytime and UPnP CDS but provide the consumer with irrelevant information. As a result, this causes an inconvenience to the consumer. Moreover, the inconvenience of using such devices is further increased due to the dual accessibility of the metadata.

SUMMARY OF THE INVENTION

The present invention addresses the aforementioned problems. An aspect of the present invention is to provide a method and apparatus for transforming digital content metadata received external to a network into digital content metadata peculiar to the network and a network system using the same.

Consistent with an aspect of the present invention, there is provided an apparatus for converting digital content metadata received external to a network into digital content metadata peculiar to the network by causing the received external digital content metadata to be mapped into the digital content metadata peculiar to the network and by locating a method of accessing a program using a unique identifier assigned to each program in the external digital content metadata.

Further, the apparatus may comprise a mapping module for causing the received external digital content metadata to be mapped into the digital content metadata peculiar to the network, and a search module for locating a method of accessing a program in a predetermined manner using the unique identifier assigned to each program in the received external digital content metadata.

Consistent with another aspect of the present invention, there is provided a network apparatus for converting digital content metadata received external to a network into digital content metadata peculiar to the network by causing the received external digital content metadata to be mapped into the digital content metadata peculiar to the network and by locating a method of accessing a program using a unique identifier assigned to each program in the external digital content metadata, and for storing the converted digital content metadata therein to allow devices in the network to use the converted digital content metadata.

Further, the network apparatus may comprise a metadata receiving unit for receiving digital content metadata external to the network, a converter for converting the received external digital content metadata into the digital content metadata peculiar to the network by causing the external digital content metadata received in the metadata receiving unit to be mapped into the peculiar digital content metadata in a predetermined manner and by locating a method of accessing a program using a unique identifier assigned to each program in the external digital content metadata, and a storage unit for storing the converted digital content metadata therein to allow devices in the network to use the converted digital content metadata.

In an exemplary embodiment of the present invention, the network apparatus further comprises a metadata filtering unit for deleting a part or all of the converted digital content metadata stored in the storage unit according to a predetermined condition.

Consistent with an aspect of the present invention, there is provided a network apparatus comprising a processing module for analyzing and using metadata which has not been mapped into properties supported by classes of digital content metadata peculiar to an existing network among external digital content metadata mapped into the digital content metadata peculiar to the network.

Consistent with a further aspect of the present invention, there is provided a network system, comprising a first network apparatus comprising a metadata receiving unit for receiving digital content metadata external to the network, a converter for converting the received external digital content metadata into digital content metadata peculiar to the network by causing the external digital content metadata received in the metadata receiving unit to be mapped into the peculiar digital content metadata in a predetermined manner and by locating a method of accessing a program using a unique identifier assigned to each program in the external digital content metadata, and a storage unit for storing the converted digital content metadata therein to allow devices in the network to use the converted digital content metadata and a second network apparatus comprising a processing module for analyzing and using metadata which has not been mapped into properties supported by classes of digital content metadata peculiar to an existing network among the external digital content metadata mapped into the digital content metadata peculiar to the network.

Consistent with a still further aspect of the present invention, there is provided a method for converting digital content metadata, comprising receiving digital content metadata external to a network causing the received external digital content metadata to be mapped into digital content metadata peculiar to the network according to a predetermined rule and locating a method of accessing a relevant content using a content reference ID (CRID) in the received external digital content metadata.

Consistent with a still further aspect of the present invention, there is provided a method for converting digital content metadata, comprising receiving digital content metadata external to a network causing the received external digital content metadata to be mapped into digital content metadata peculiar to the network according to a predetermined rule locating a method of accessing a relevant content using a content reference ID (CRID) in the received external digital content metadata and storing the external digital content metadata converted into the digital content metadata peculiar to the network on the basis of mapping information and the method of accessing the content.

Consistent with an exemplary embodiment, the received external digital content metadata are TV-Anytime metadata and the digital content metadata peculiar to the network are UPnP CDS metadata.

Consistent with an exemplary embodiment, the method of accessing the program uses a Uniform Resource Locator (URL).

BRIEF DESCRIPTION OF THE DRAWINGS

The above and other aspects, features and advantages of the present invention will become apparent from the following description of exemplary embodiments given in conjunction with the accompanying drawings, in which:

FIG. 7 is a flowchart illustrating a process of transforming TV-Anytime metadata into UPnP content directory service metadata.

DETAILED DESCRIPTION OF THE INVENTION

Figure 1:
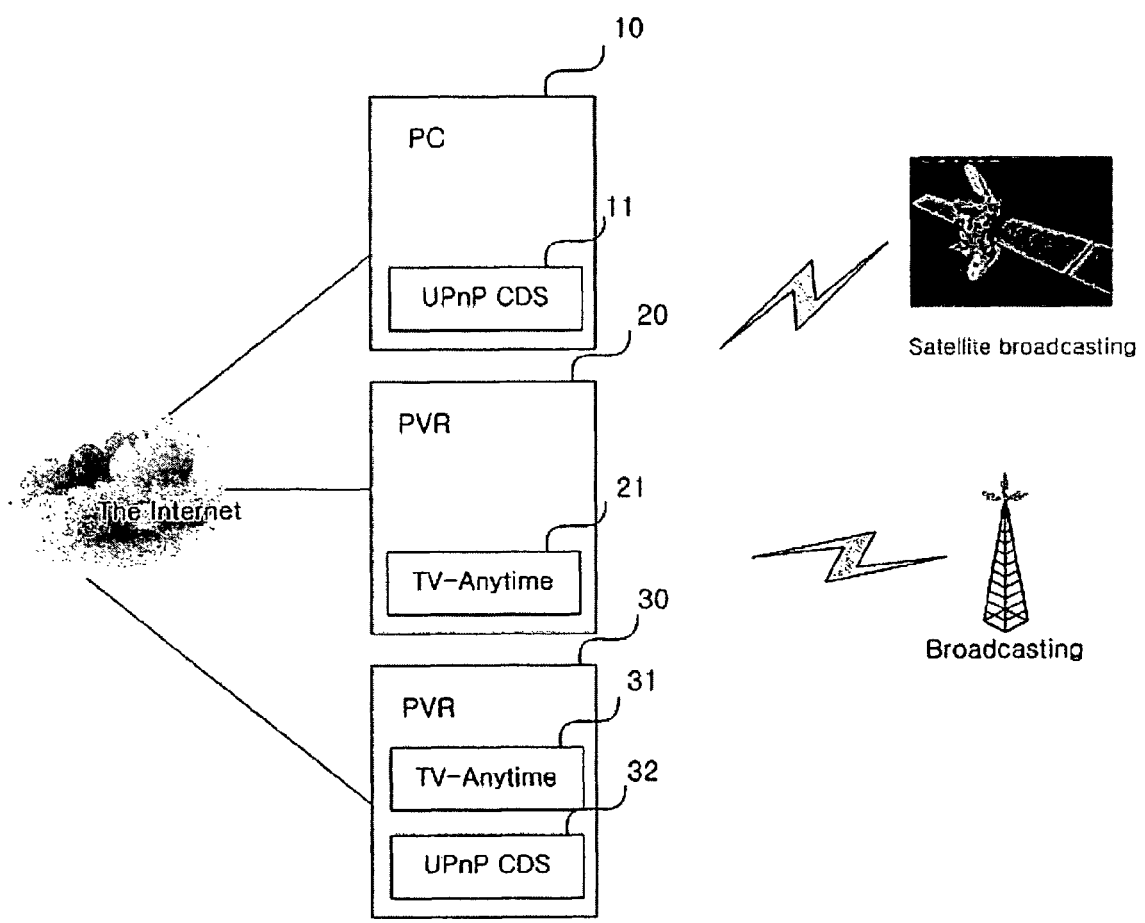
FIG. 1 is a view showing an environment where TV-Anytime and UPnP content directory services are used.

Hereinafter, exemplary embodiments of the present invention will be described in detail with reference to the accompanying drawings, in which like reference numerals are used to indicate similar elements.

Although TV-Anytime metadata corresponds to an example of digital content metadata received external to a network, UPnP CDS metadata corresponds to an example of digital content metadata peculiar to a network, and a method of using a URL is discussed as an example of a method of accessing a program or content are hereinafter described, it should be noted that the present invention is not limited to the exemplary embodiments thereof.

Figure 4:
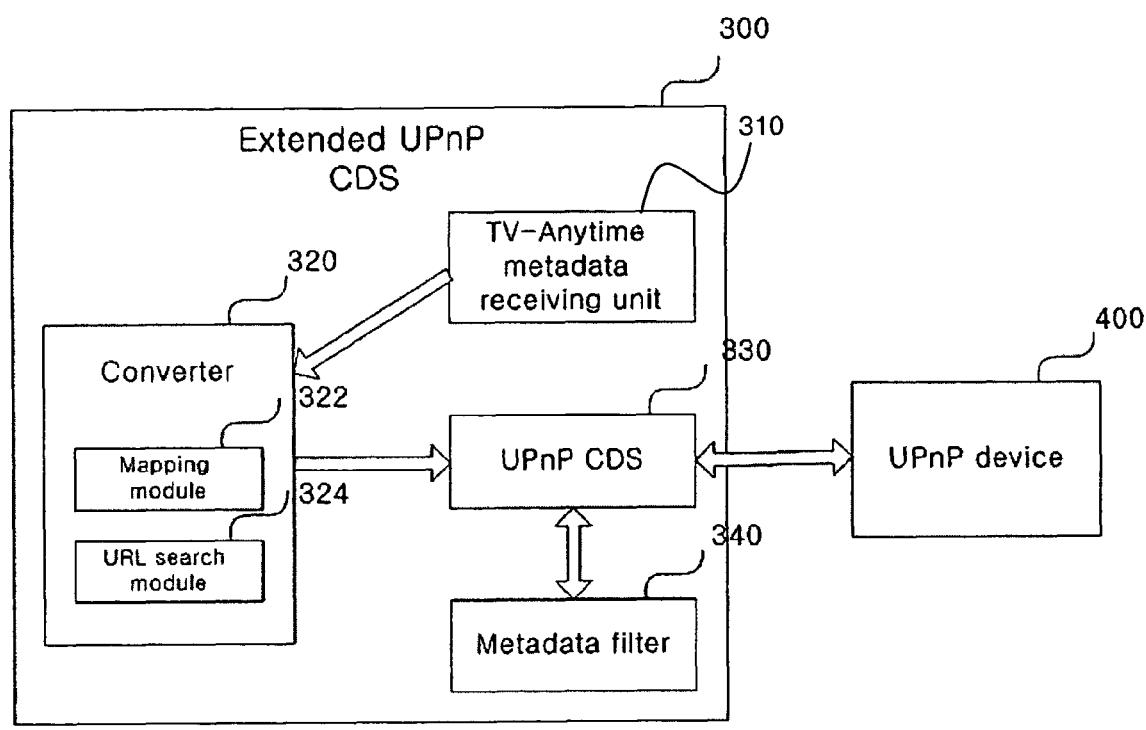
FIG. 4 is a diagram showing the configuration of the entire system where UPnP devices can use TV-Anytime metadata consistent with the present invention.
Figure 5A:
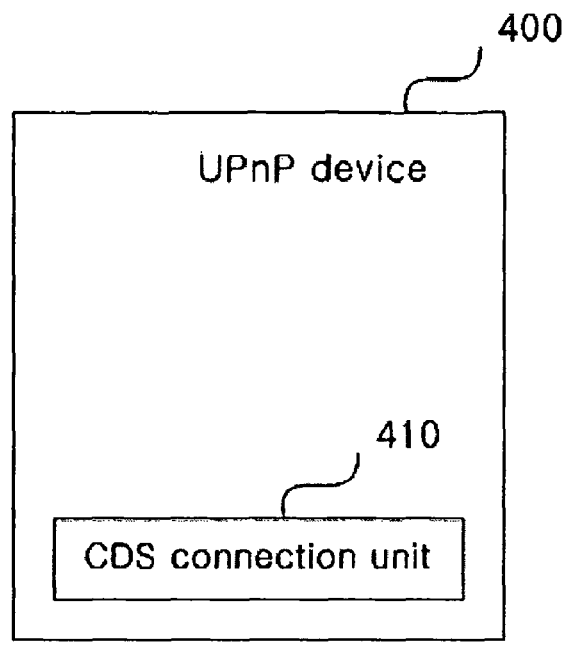
FIGS. 5a and 5b are diagrams showing a UPnP device that uses extended content directory service shown in FIG. 4.
Figure 5B:
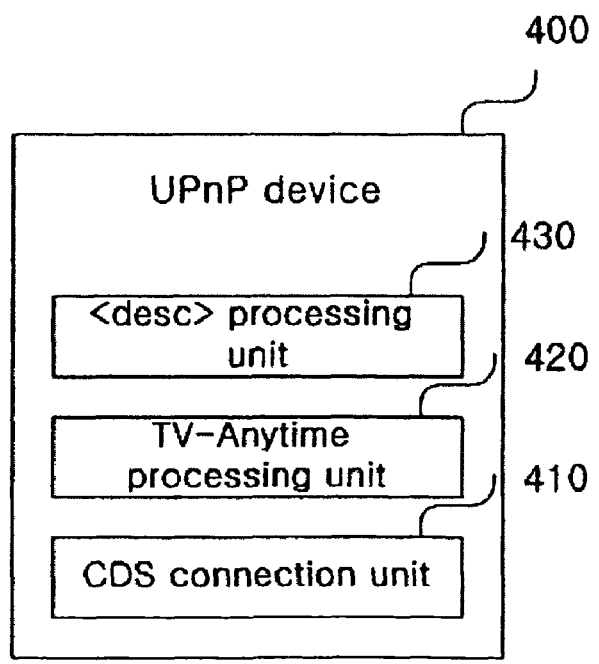

FIG. 4 is a diagram showing the configuration of the entire system where UPnP devices can use TV-Anytime metadata consistent with an exemplary embodiment of the present invention, and FIGS. 5a and 5b show a UPnP device that uses the extended content directory service of FIG. 4.

Referring to the figures, the system of the present invention comprises an extended UPnP CDS device 300 for supporting TV-Anytime metadata, and a UPnP device 400 for using content provided from TV-Anytime through the extended UPnP CDS device 300.

The extended UPnP CDS device 300 comprises a metadata receiving unit 310 for receiving the TV-Anytime metadata, a converter 320 for converting the received TV-Anytime metadata into the UPnP metadata, and a UPnP CDS unit 330 for providing content directory services to the UPnP device 400. The extended UPnP CDS device 300 further comprises a metadata filter 340 for filtering out (deleting) unnecessary data among the converted TV-Anytime metadata in order to prevent an overhead of metadata. The TV-Anytime metadata receiving unit 310 is a module for receiving TV-Anytime metadata through an external broadcasting network or an Internet network. The converter 320 comprises a mapping module 322 for converting the TV-Anytime metadata into the UPnP CDS format according to a predetermined rule, and a URL search module 324 for locating a URL of a program using a CRID, which is an identifier of a program existing in TV-Anytime metadata. As an example of a method for locating the URL, a location resolution method may be used.

FIGS. 5a and 5b show the UPnP device 400 that is shown in FIG. 4 and uses the extended UPnP CDS device. FIG. 5a shows a conventional UPnP device, and FIG. 5b shows an UPnP device that comprises an additional module for processing the portion of TV-Anytime metadata that is not covered by the UPnP class. Here, the UPnP device means a control point using UPnP CDS, and each of the UPnP devices comprises a CDS connection unit 410 for connecting with the UPnP CDS. Hereinafter, the UPnP device of FIG. 5a will be referred to as the "UPnP device", and the UPnP device of FIG. 5b will be referred to as the "extended UPnP device". The extended UPnP device 400 may comprise a <desc> processing unit 430 for processing <desc> to process the converted TV-Anytime metadata. The <desc> means a portion where UPnP records metadata that are not defined as a class. The conventional UPnP device 400 ignores information described in the <desc>, since it does not include a module for processing the <desc>. However, since the extended UPnP device 400 comprises the <desc> processing unit, it can use the metadata described in the <desc>. The portion of the converted TV-Anytime metadata, which is not covered by the UPnP class, may be processed by using a new class defined for the portion without using the <desc>. To this end, the extended UPnP device 400 may comprise a TV-Anytime processing unit 420.

Figure 2A:
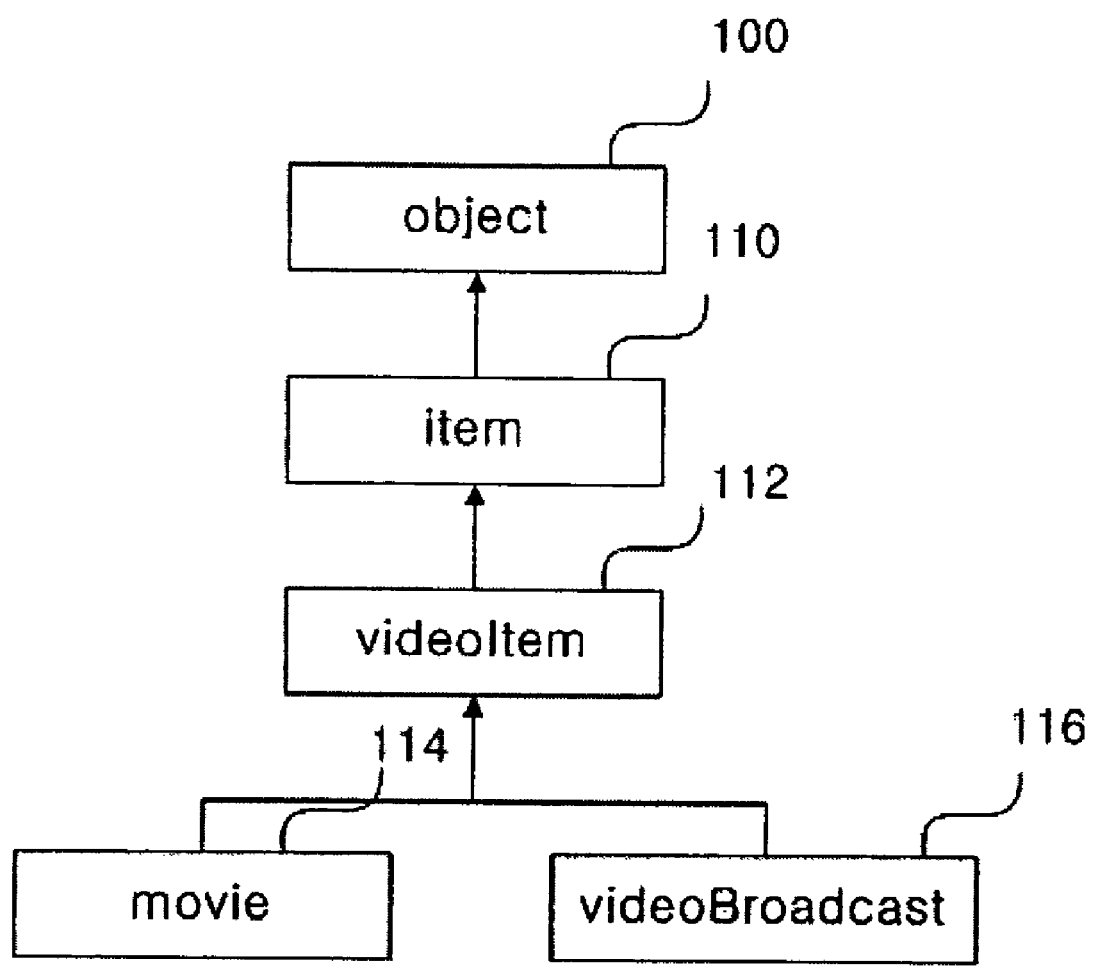
FIGS. 2a and 2b are diagrams schematically showing the hierarchical structure of metadata for UPnP content directory services.
Figure 2B:
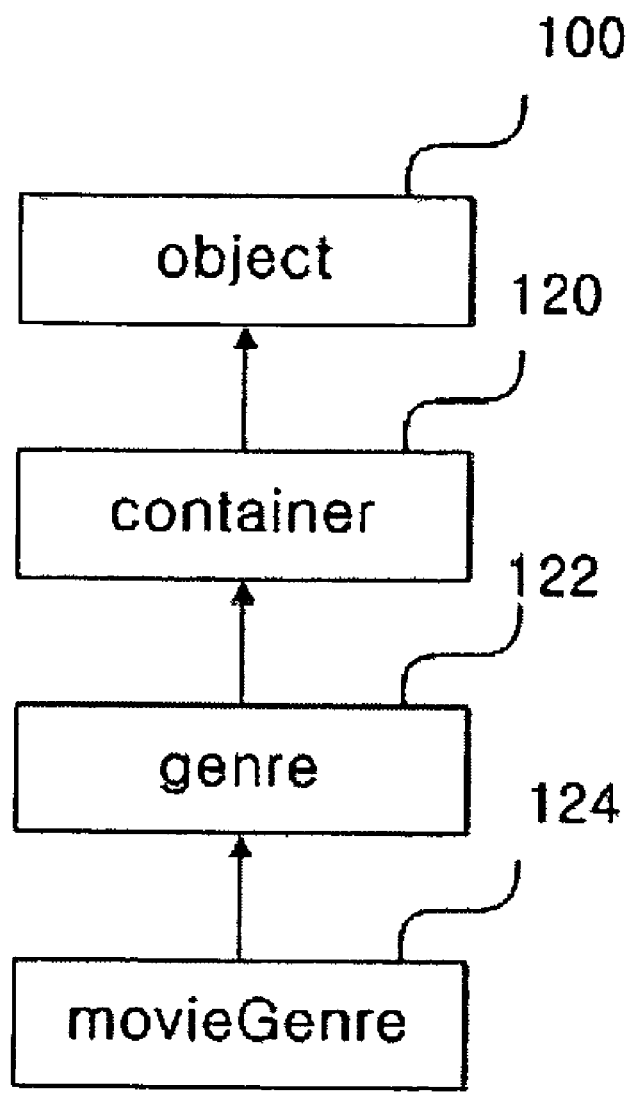
Figure 6A:
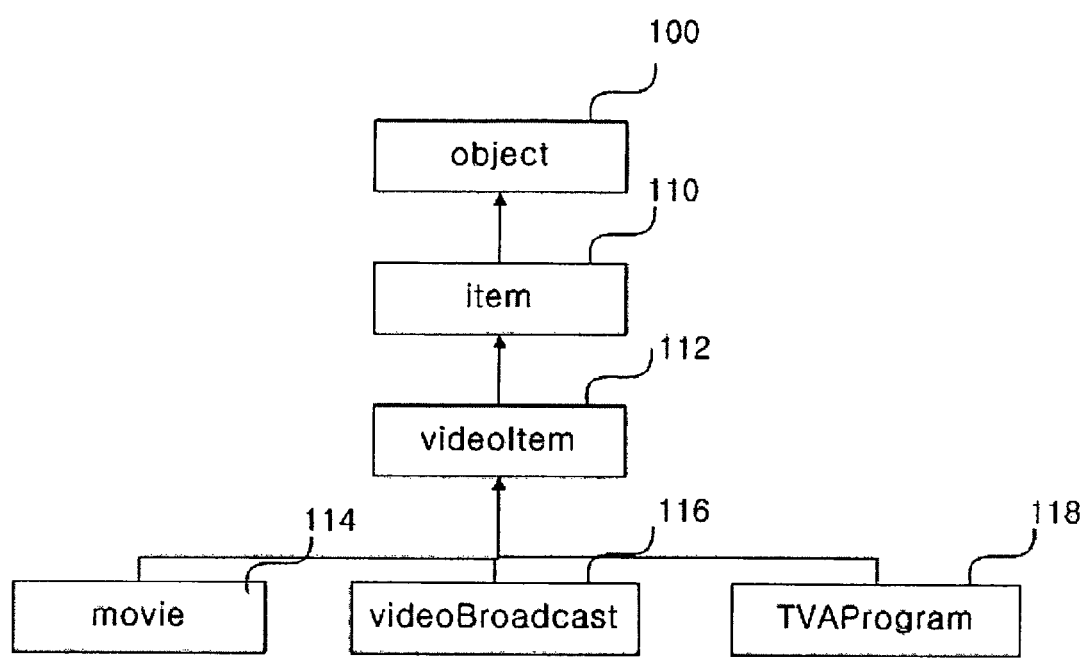
FIG. 6a is a diagram showing a class hierarchical structure of UPnP content directory service comprising a newly defined class for transforming a program class of TV-Anytime.
Figure 6B:
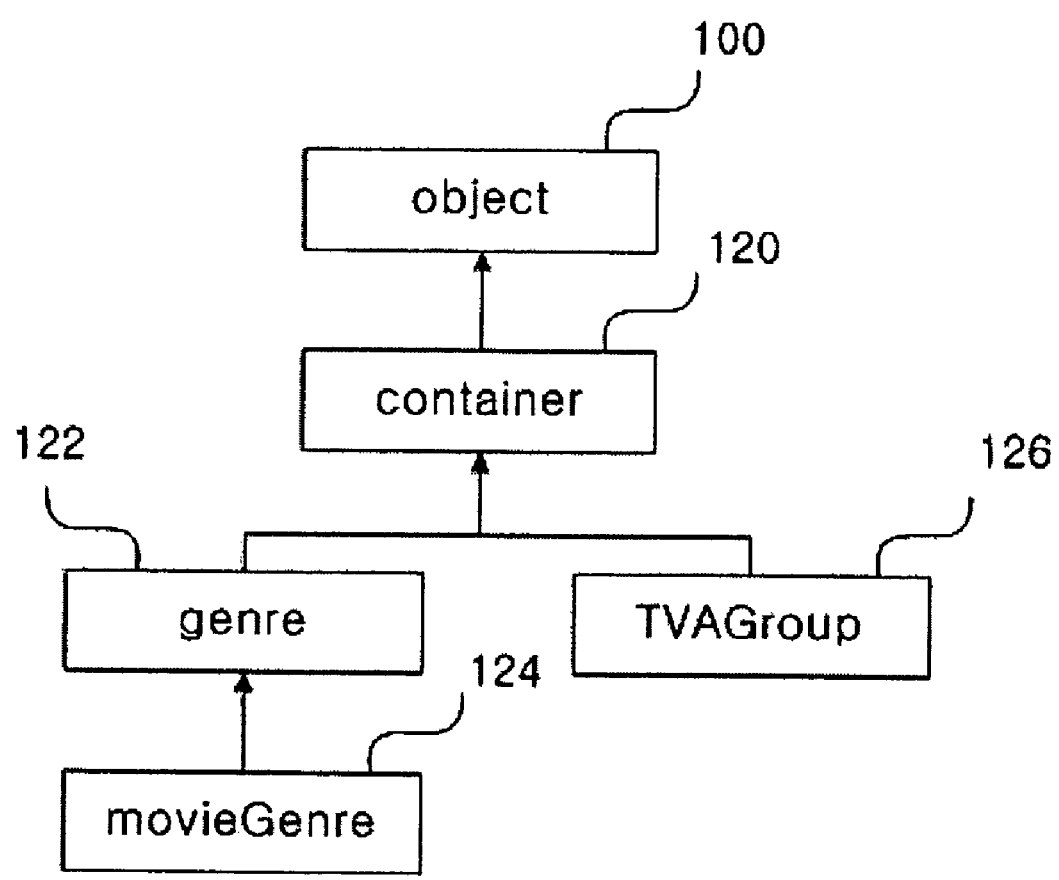
FIG. 6b is a diagram showing a class hierarchical structure of UPnP content directory service comprising a newly defined class for transforming a group class of TV-Anytime.

FIG. 6a shows a class hierarchical structure of UPnP CDS comprising a newly defined class for transforming a program class of TV-Anytime, and FIG. 6b shows a class hierarchical structure of UPnP CDS comprising a newly defined class for converting a group class of TV-Anytime. As compared with FIGS. 2a and 2b, a TVAProgram class 118 is added to FIG. 6a and a TVAGroup class 126 is added to FIG. 6b. Thus, the extended UPnP device 400 comprising a TV-Anytime processing unit 420 or a <desc> processing unit 430 can use many more services described in TV-Anytime metadata through the newly defined classes.

FIG. 7 is a flowchart showing a process of converting TV-Anytime metadata into UPnP CDS metadata.

Referring to FIG. 7, TV-Anytime metadata are first received (S10). The received TV-Anytime metadata are mapped into UPnP CDS metadata (S20). Then, a URL is located using a TV-Anytime CRID (S30). Finally, the converted TV-Anytime metadata are reflected onto the UPnP CDS (S40).

As an example, a rule for the mapping step (S20) will be explained for the program and the group, among TV-Anytime metadata.

The rule for the program will be first discussed. There is a method of mapping TV-Anytime metadata into the movie and videoBroadcast classes provided by UPnP CDS and a method of extending a class layer of UPnP CDS by defining a TVAProgram corresponding to a new class. As for the first method, a rule as to how to fill the properties of the UPnP CDS classes using TV-Anytime information is first required. The following Table 2 shows such a conversion rule. In Table 2, "x/y" means an element "y" in XML <x><y/></x> and "x/@y" means an "attribute y" value of an element "x" in XML <x y=" . . . "/>.

TABLE 2

| Name of UPnP CDS class | Property of UPnP CDS class | Metadata to be converted into UPnP property among metadata representing program of TV-Anytime |
|---|---|---|
| object | Id | Conform to assignment by UPnP CDS |
| | Parented | Conform to assignment by UPnP CDS |
| | Title | ProgramInformation/BasicDescription/Title or ProgramInformation/BasicDescription/ShortTitle or ProgramInformation/BasicDescription/MediaTitle |
| | Res | URI obtained by the module [530] for obtaining location using CRID |
| | res/@iportURI | URI obtained by the module [530] for obtaining location using CRID when imported |
| | res/@protocolInfo | ProgramInformation/AVAttributes/FileFormat |
| | res/@size | ProgramInformation/AVAttributes/FileSize |
| | res/@duration | ProgramLocationTable/Schedule/ScheduleEvent/PublishedDuration or ProgramLocationTable/BroadcastEvent/PublishedDuration or ProgramLocationTable/OnDemandProgram/PublishedDuration |
| | res/@bitrate | ProgramInformation/AVAttributes/BitRate |
| | res/@nrAudioChannels | ProgramInformation/AVAttributes/AudioAttribute/NumOfChannels |
| | res/@resolution | ProgramInformation/AVAttributes/VideoAttribute/HorizontalSize*ProgramInformation/AVAttributes/VideoAttribute/VerticalSize |

TABLE 2-continued

| Name of UPnP CDS class | Property of UPnP CDS class | Metadata to be converted into UPnP property among metadata representing program of TV-Anytime |
|---|---|---|
| | res/@cholorDepth | ProgramInformation/AVAttributes/VideoAttribute/Color |
| | Clas | Conforms to assignment by UPnP CDS. Becomes movie or videoBroadcast |
| | Restricted | "true" |
| | refID | Represents the id of the whole aggregating program when program to be converted is aggregatedProgram |
| videoItem | Genre | ProgramInformation/BasicDescription/Genre |
| | longDescription | A value obtained by combining: ProgramInformation/BasicDescription/Synopsis, ProgramInformation/BasicDescription/PromotionalInformation, and ProgramLocationTable/Schedule/ScheduleEvent/Instance Description |
| | Producer | If ProgramInformation/BasicDescription/CreditsList/Credits Item/@role == producer, a value designated by ProgramInformation/BasicDescription/CreditsList/Credits Item/PersonName, or ProgramInformation/BasicDescription/CreditsList/Credits Item/PersonNameIDRef |
| | Rating | ProgramReviewTable/review/Rating |
| | Actor | If ProgramInformation/BasicDescription/CreditsList/CreditsItem/ @role == (actor(, a value designated by ProgramInformation/BasicDescription/CreditsList/CreditsItem/ PersonName, or ProgramInformation/BasicDescription/CreditsList/CreditsItem/ PersonNameIDRef |
| | Director | If ProgramInformation/BasicDescription/CreditsList/CreditsItem/ @role == (director(, a value designated by ProgramInformation/BasicDescription/CreditsList/CreditsItem/ PersonName, or ProgramInformation/BasicDescription/CreditsList/CreditsItem/ PersonNameIDRef |
| | Description | A value obtained by combining: ProgramInformation/BasicDescription/Synopsis, ProgramInformation/BasicDescription/PromotionalInformation, and ProgramLocationTable/Schedule/ScheduleEvent/Instance Description |
| | Publisher | ServiceInformationTable/ServiceInformation/Owner |
| | Language | ProgramInformation/BasicDescription/Language |
| movie | channelName | ServiceInformationTable/ServiceInformation/Name |
| | scheduledStartTime | ProgramLocationTable/Schedule/ScheduleEvent/Published StartTime or ProgramLocationTable/BroadcastEvent/PublishedStart Time |
| | scheduledEndTime | ProgramLocationTable/Schedule/ScheduleEvent/Published EndTime or ProgramLocationTable/BroadcastEvent/PublishedEnd Time |
| videoBroadcast | Icon | ServiceInformationTable/ServiceInformation/Logo |
| | Region | ProgramInformation/BasicDescription/ReleaseInformation/ ReleaseLocation |
| | channelNr | ServiceInformationTable/ServiceInformation/Name |

Figure 3:
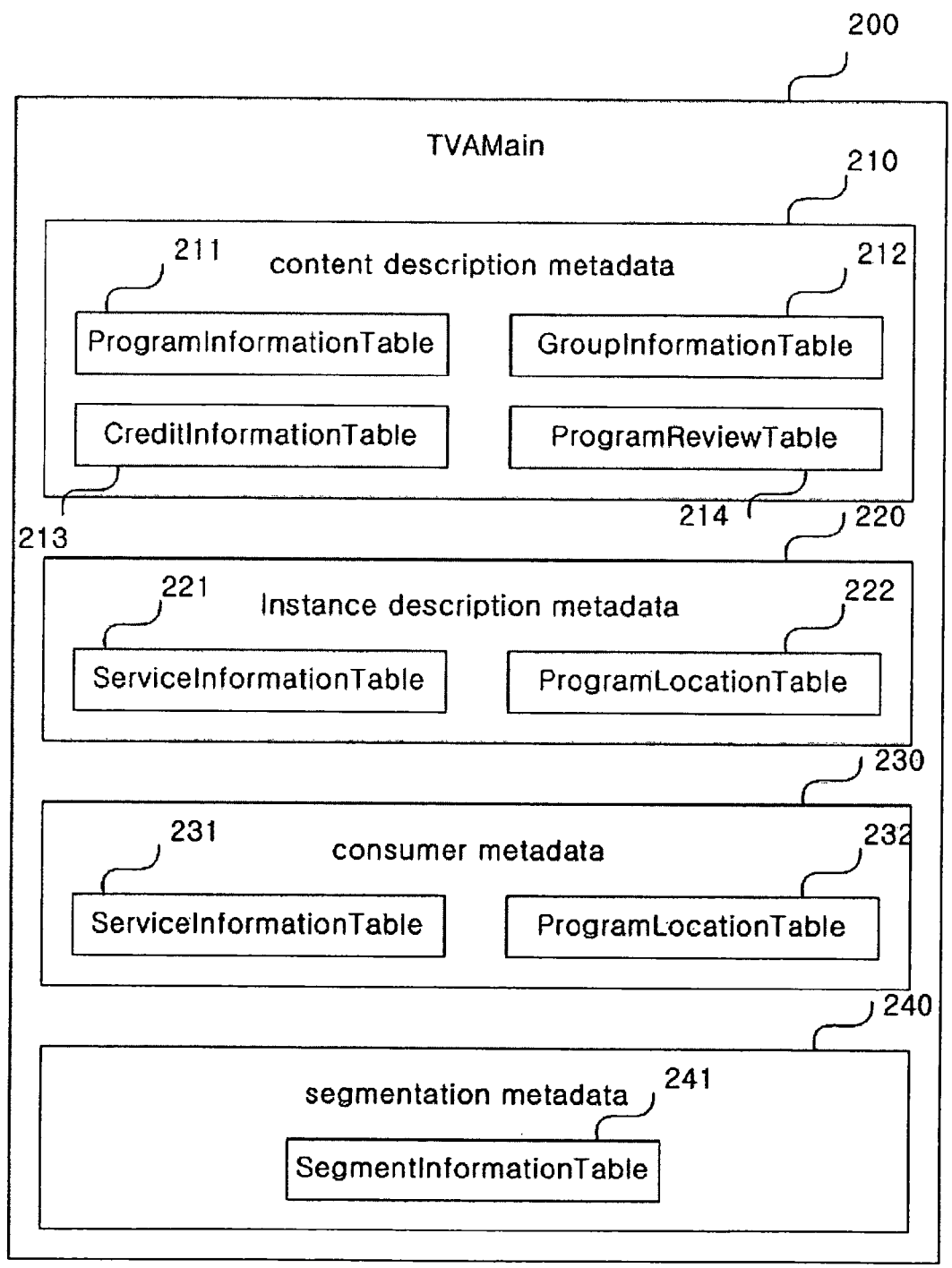
FIG. 3 is a diagram showing the configuration of TV-Anytime metadata.

Even after the mapping has been performed according to the rules of Table 2, a large quantity of data provided from TV-Anytime remain unconverted. The unconverted data can be stored in the <desc> provided by UPnP. In such a case, only additional information for a movie or videoBroadcast class will be stored in the <desc>. As shown in FIG. 3, a great deal of information connected in a complex manner is included in the TV-Anytime metadata. It is the identifier, CRID, that connects the above information. Therefore, it is necessary to gather the information bounded by the same CRID during the mapping process, i.e. the same program information, and insert the information into the <desc> of a movie or videoBroadcast class into which a program is mapped. The following corresponds to an example of the TV-Anytime metadata.

```
<TVAMain version="03" xml:lang="en" publisher="..." publicationTime="...">
    <CopyrightNotice>...</CopyrightNotice>
    <ProgramDescription>
        <ProgramInformationTable>
```

```
        <ProgramInformation programId="crid://hbc.com/
            cartoon/robotX">
            <BasicDescription>
                <Title type="main">Robot X</Title>
                <Synopsis length="short">Robot X saves the
                world</Synopsis>
            </BasicDescription>
        </ProgramInformation>
        <ProgramInformation programId="crid://hbc.com/
            cartoon/robotY">
            <BasicDescription>
                <Title type="main">Robot Y</Title>
                <Synopsis length="short">Robot Y saves the
                world</Synopsis>
            </BasicDescription>
        </ProgramInformation>
    </ProgramInformationTable>
</ProgramDescription>
<ProgramLocationTable>
    <BroadcastEvent serviceIDRef = "hbc100022311">
        <Program crid="crid://hbc.com/cartoon/robotX"/>
        <ProgramURL>dvb://1.4ee2.3f5/</ProgramURL>
        <PublishedStartTime>2001-04-
07T19:00:00.00+01:00</PublishedStartTime>
        <PublishedDuration>PT6H</PublishedDuration>
        <Live value="false"/>
        <Repeat value="true"/>
        <FirstShowing value="false"/>
        <LastShowing value="false"/>
        <Free value="false"/>
    </BroadcastEvent>
    <BroadcastEvent serviceIDRef = "hbc100022312">
        <Program crid="crid://hbc.com/cartoon/robotY"/>
        <ProgramURL>dvb://1.4ee2.3f5/</ProgramURL>
        <PublishedStartTime>2001-04-
08T19:00:00.00+01:00</PublishedStartTime>
        <PublishedDuration>PT4H</PublishedDuration>
        <Live value="false"/>
        <Repeat value="true"/>
        <FirstShowing value="false"/>
        <LastShowing value="false"/>
        <Free value="false"/>
    </BroadcastEvent>
</ProgramLocationTable>
</TVAMain>
```

This metadata comprises information on two programs called robotX and robotY, and information on the broadcasting hours of the two programs. At this time, one of the UPnP CDS videoBroadcast classes, into which the metadata have been converted, may indicate information on robotX and the other may indicate information on robotY Further, the <desc> of robotX selectively comprises <ProgramInformation> and <BroadcastEvent> of robotX, and the <desc> of robotY selectively comprises <ProgrammInformation> and <BroadcastEvent> of robotY. In such a case, the TV-Anytime metadata representing robotX are converted into an <item> of UPnP CDS, as follows.

```
<item ...>
    <dc:title>Robot X</dc:title>
    <upnp:class>object.item.videoItem.videoBroadcast</upnp:class>
    <res ...> ... </res>
    <desc ...>
        <TVAMain version="03"  xml:lang="en"  publisher="..."
publicationTime="...">
            <CopyrightNotice>...</CopyrightNotice>
            <ProgramDescription>
                <ProgramInformationTable>
                    <ProgramInformation
programId="crid://hbc.com/cartoon/robotX">
                        <BasicDescription>
                            <Title type="main">Robot X</Title>
                            <Synopsis length="short">Robot X saves the
world</Synopsis>
                        </BasicDescription>
                    </ProgramInformation>
                </ProgramInformationTable>
            </ProgramDescription>
            <ProgramLocationTable>
                <BroadcastEvent serviceIDRef = "hbc100022311">
                    <Program crid="crid://hbc.com/cartoon/robotX"/>
                    <ProgramURL>dvb://1.4ee2.3f5/</ProgramURL>
                    <PublishedStartTime>2001-04-
07T19:00:00.00+01:00</PublishedStartTime>
                    <PublishedDuration>PT6H</PublishedDuration>
                    <Live value="false"/>
                    <Repeat value="true"/>
                    <FirstShowing value="false"/>
                    <LastShowing value="false"/>
                    <Free value="false"/>
                </BroadcastEvent>
            </ProgramLocationTable>
        </TVAMain>
    </desc>
</item>
```

That is, the <desc> of a videoBroadcast representing robotX comprises only information on robotX. There may exist various methods for performing such a process. One method is to use a space for storing a document object model (DOM) tree of an XML parser and specific DOM trees of the entire DOM tree. In other words, according to the above example, a storage space for storing nodes of the DOM tree representing robotX is first prepared, and information on a DOM tree whose CRID corresponds to robotX, i.e. a DOM tree having <ProgramInformation programId="crid://hbc.com/cartoon/robotX"> and <BroadcastEvent serviceIDRef= "hbc100022311"> as its root nodes in case of the above example, among XML DOM tree information, is stored in the storage space while processing the TV-Anytime metadata. Thereafter, when robotX information is requested, the converter can access the storage space relevant to robotX, read the stored two DOM trees, and then finally generate the <desc> portion of the UPnP CDS metadata.

When the <desc> is used in such a manner, the general UPnP device 400 of FIG. 5a ignores the <desc>, whereas the extended UPnP device 400 of FIG. 5b can receive the TV-Anytime metadata through the <desc> processing unit for processing the <desc> and use the received information in an appropriate manner.

Furthermore, the mapping can be performed using the TV-Anytime processing unit 420 after defining a new class TVAProgram. This newly defined class also has most of the properties of the existing movie and videoBroadcast classes. The reason why the new class whose properties are the same as those of the existing classes is defined and prepared is that the extended UPnP device that recognizes this class can directly locate the class, which is transformed and generated from the TV-Anytime metadata, through a search corresponding to one of application program interfaces (APIs) of the UPnP CDS unit 330 and that the TV-Anytime processing unit 420 capable of processing a TVAProgram can directly process the searched results.

The conversion of a group of TV-Anytime metadata will be now described. Referring to FIG. 6b, the container class 120 comprising an item class 110 is provided in UPnP CDS. A genre class 122 and a movieGenre class 124 among the subclasses of the container class are directly related to TV-Anytime metadata, and represent a collection of items according to genres. However, the grouping of items according to genres is not the same as a concept of a group provided by TV- Anytime metadata. In order to cause the group concept provided by TV-Anytime metadata to be put into UPnP CDS, it is necessary to define and provide a new TVAGroup class 126. Table 3 shows the properties of the TVAGroup class and upper classes thereof, and the TV-Anytime metadata for filling these properties.

Then, it is checked whether there are undetermined, converted TV-Anytime metadata (S110). Such a check can be performed by the metadata filter 340 of the extended UPnP CDS device 300 shown in FIG. 4. If there are no undetermined TV-Anytime metadata, the filtering is stopped. Otherwise, it is checked whether the remaining TV-Anytime meta-

TABLE 3

| Name of UPnP CDS class | Property of UPnP CDS class | Metadata to be converted into UPnP property among metadata representing program of TV-Anytime |
|---|---|---|
| object | Id | Conforms to assignment by UPnP CDS |
|  | parentID | Conforms to assignment by UPnP CDS |
|  | Title | ProgramInformation/BasicDescription/Title or ProgramInformation/BasicDescription/ShortTitle or ProgramInformation/BasicDescription/MediaTitle |
|  | Class | Conforms to assignment by UPnP CDS. Becomes TVAGroup. |
|  | restricted | "true" |
| container | childCount | GroupInformation/numOfItems |
|  | searchClass | Conforms to assignment by UPnP CDS |
|  | searchable | "true" |
| TVAGroup | description | Combination of GroupInformation/BasicDescription/Synopsis and GroupInformation/BasicDescription/PromotionalInformation |
|  | Genre | GroupInformation/BasicDescription/Genre |
|  | producer | If GroupInformation/BasicDescription/CreditsList/CreditsItem/@role == producer, value designated by ProgramInformation/BasicDescription/CreditsList/CreditsItem/Person Name or ProgramInformation/BasicDescription/CreditsList/CreditsItem/Person NameIDRef |
|  | Actor | If GroupInformation/BasicDescription/CreditsList/CreditsItem/@role == actor, value designated by ProgramInformation/BasicDescription/CreditsList/CreditsItem/Person Name or ProgramInformation/BasicDescription/CreditsList/CreditsItem/Person NameIDRef |
|  | director | If ProgramInformation/BasicDescription/CreditsList/CreditsItem/@role == director, value designated by ProgramInformation/BasicDescription/CreditsList/CreditsItem/Person Name or ProgramInformation/BasicDescription/CreditsList/CreditsItem/Person NameIDRef |
|  | Rating | ProgramReviewTable/review/Rating |
|  | publisher | ServiceInformationTable/ServiceInformation/Owner |
|  | language | GroupInformation/BasicDescription/Language |
|  | Region | GroupInformation/BasicDescription/ReleaseInformation/ReleaseLocation |

According to the rules taken as an example, the UPnP devices can use the information by mapping the TV-Anytime metadata into the UPnP CDS metadata (S20), locating the URL using the TV-Anytime CRID (S30), and then reflecting the mapping information and URL onto UPnP CDS (S40).

Figure 8:
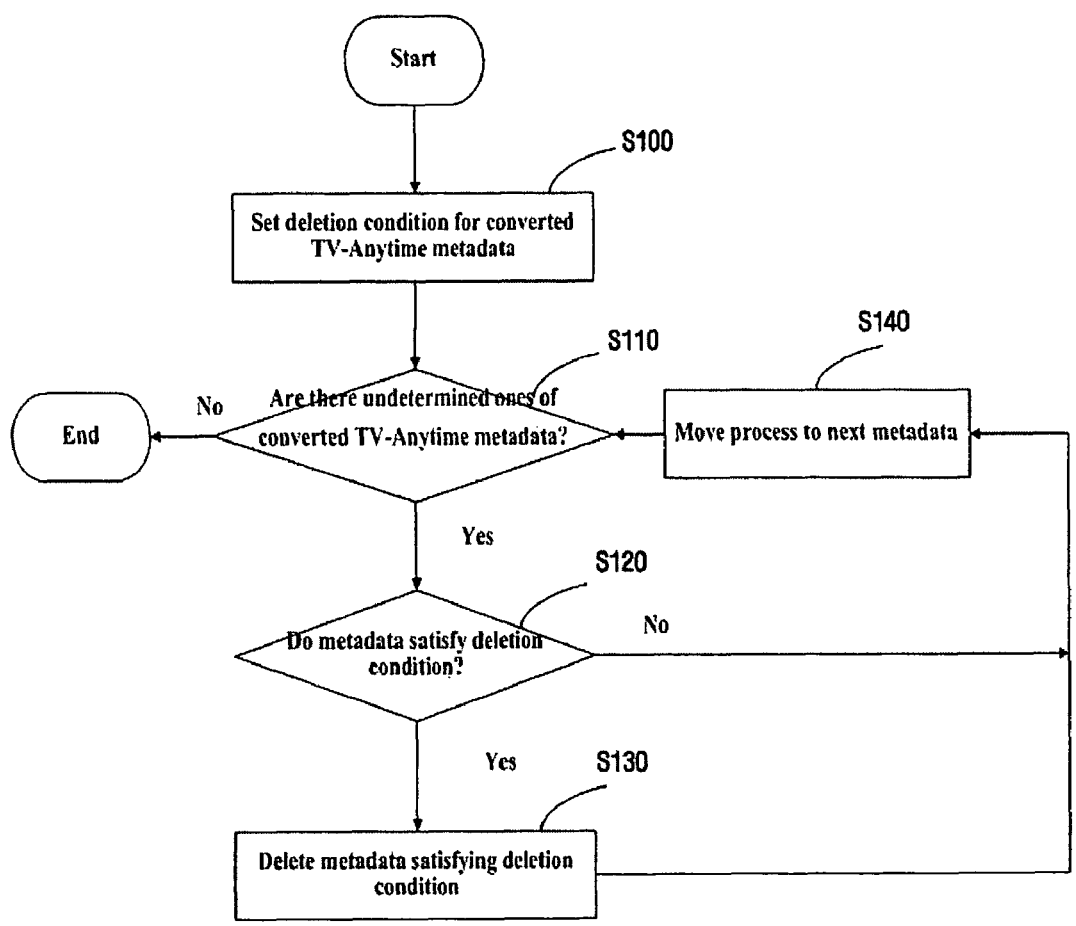
FIG. 8 is a flowchart illustrating a process of deleting metadata with a predetermined condition among TV-Anytime metadata transformed into UPnP content directory service metadata.

FIG. 8 is a flowchart illustrating a process of deleting metadata with a specific condition among TV-Anytime metadata transformed into UPnP CSD metadata. Such a process is needed for reducing waste of hardware resources and search time by deleting unnecessary information, because it is not common for the consumer to watch again a broadcast from which a predetermined period of time has elapsed.

To this end, a user sets a deletion condition for metadata converted from TV-Anytime metadata (S100). The deletion condition may be initially given as a default value or may be set by a user. As an example of the deletion condition, there may be a method of deleting the specific metadata after a period set by a UPnP CDS as a default value, a method of deleting the metadata after a period input by a user, a method of deleting the metadata after a period required by a program provider, a method of deleting the metadata when a specific event occurs, or the like.

data satisfy the deletion condition set at step S100 (S120). If the TV-Anytime metadata satisfies the deletion condition, the relevant metadata are deleted (S130) and the process then moves to the next metadata (S140) to process the next metadata and the process returns to step S110. Otherwise, the process moves to the next metadata to process the next metadata (S140) and then returns to step S110.

The foregoing process may be described with a pseudo code, as follows:

```
p = first item of 'metadata converted from TV-anytime'
while (p!=null)
{
    if (is p under deletion condition?),
        then delete p
    p = next 'metadata converted from TV-anytime'
}
```

Consistent with the present invention so constructed, the devices requiring the content metadata can use a single interface peculiar to a network, e.g. UPnP CDS. Thus, the digital content received external to the network can be utilized while minimizing additional costs generated when supporting the digital content metadata, e.g. the TV-Anytime metadata.

Further, the devices in the network can use the digital content metadata received external to the network, and thus, content producers, broadcasting companies or the like can provide consumers or users with high quality services.

Although the present invention has been described in connection with the exemplary embodiments thereof, it will be apparent to those skilled in the art that various changes and modifications can be made thereto without departing from the scope and spirit of the present invention defined by the appended claims. For example, although the mapping has been described on the basis of a program and group, the present invention is not limited to thereto and can be readily applied to other cases.

It should be understood that the embodiments of the present invention are not restrictive but illustrative in every respect. That is, the scope of the present invention is defined by the appended claims rather than the detailed description of the invention, and all changes or modifications made from the spirit and scope of the invention and equivalents thereof should be construed as falling within the scope of the invention.

What is claimed is:

1. An apparatus operable to convert digital content metadata comprising:
   a mapping module for converting received external digital content metadata which is TV-Anytime metadata into digital content metadata peculiar to a network which is Universal Plug and Play (UPnP) Content Directory service (CDS) metadata using a predetermined rule; and
   a search module for locating a Uniform Resource Locator (URL) using a Content Reference Identifier (CRID), which is a unique identifier pre-assigned to each program and in a format of the TV-Anytime metadata, where the search module, without further conversion into the UPnP metadata, identifies said URL, said URL accessing a program in the received TV-Anytime metadata,
   wherein the search module locates the URL after the TV-Anytime metadata is converted by the mapping module, and
   wherein the predetermined rule comprises:
   a first conversion method in which TV-Anytime metadata is mapped into at least one of a movie class and a video class of UPnP CDS, and
   a second conversion method in which a class layer of the UPnP CDS is extended to include at least a portion of the TV-Anytime metadata by defining a new UPnP CDS class, and
   wherein the unconverted data is stored in a predetermined area of a memory.

2. The apparatus of claim 1, wherein the mapping module converts the received external digital content metadata into the digital content metadata peculiar to the network by mapping the external digital content metadata into classes of the digital content metadata peculiar to the network.

3. The apparatus of claim 1, wherein the mapping module converts the received external digital content metadata into the digital content metadata peculiar to the network by defining a new class of the digital content metadata peculiar to the network, said new class corresponding to the received external digital content metadata.

4. The apparatus of claim 1, wherein the unique identifier located in the received external digital content metadata binds information of the received external digital content metadata, wherein the mapping module uses the information bound by the unique identifier for converting received external digital content metadata into digital content metadata peculiar to a network, and
wherein additional unconverted metadata from the received external digital content metadata is placed in a <desc> section, which is a section for metadata that is not defined in a class of the digital content metadata peculiar to the network.

5. The apparatus of claim 1, wherein the first conversion method comprises a definition rule in which "x/y" means an element "y" in XML <x><y/></x> and "x/@y" means an "attribute y" value of an element "x" in XML <x y=" . . . "/>.

6. The apparatus of claim 5, wherein the first conversion method comprises using the definition rule: mapping URI in TV-Anytime format into a UPnP object class, mapping program information in TV-Anytime format into video class in which properties provide information about video item, and mapping program location information in TV-Anytime format into properties that provide information about a movie item.

7. The apparatus of claim 1, wherein the second conversion method comprises extending at least one of the movie class and the video class of the UPnP CDS using a document object model tree of an XML parser and specific document object model sub-trees of the document object model tree.

8. The apparatus of claim 1, wherein additional unconverted metadata from the received external digital content metadata is placed in a <desc> section, which is a section for metadata that is not defined in a class of the digital content metadata peculiar to the network.

9. The apparatus of claim 1, wherein the second conversion method comprises generating a newly defined class that comprises at least some properties of the existing movie class and video class.

10. A network apparatus operable to convert digital content metadata comprising:
   a metadata receiving unit which receives digital content metadata external to the network which is TV-Anytime metadata;
   a converter which converts the TV-Anytime metadata into the digital content metadata peculiar to the network which is Universal Plug and Play (UPnP) Content Directory service (CDS) metadata using a predetermined rule by causing the TV-Anytime received in the metadata receiving unit to be mapped into the UPnP metadata in a predetermined manner and by locating a Uniform Resource Locator (URL) using a Content Reference Identifier (CRID), which is a unique identifier, pre-assigned to each program and is in a format of the TV-Anytime metadata and where without further conversion into the UPnP metadata, identifies said URL, wherein said URL accesses a program in the received TV-Anytime metadata, and wherein the URL is located after the received TV-Anytime metadata is mapped into the UPnP metadata; and
   a storage unit which stores the converted TV-Anytime metadata therein to allow devices in the network to use the converted TV-Anytime metadata,
   wherein the predetermined rule comprises:
   a first conversion method implemented by the converter in which TV-Anytime metadata is mapped into at least one of a movie class and a video class of UPnP CDS, and
   a second conversion method implemented by the converter in which a class layer of the UPnP CDS is extended to include at least a portion of the TV-Anytime metadata by defining a new UPnP CDS class, and wherein the unconverted data is stored in a predetermined area of a memory.

11. The apparatus as claimed in claim 10, further comprising a metadata filtering unit for deleting a part or all of the converted digital content metadata stored in the storage unit according to a predetermined condition.

12. The apparatus as claimed in claim 10, further comprising a processing module for analyzing and using metadata which has not been mapped into properties supported by classes of digital content metadata peculiar to an existing network among external digital content metadata mapped into the digital content metadata peculiar to the network.

13. The apparatus as claimed in claim 12, wherein the received external digital content metadata is TV-Anytime metadata and the digital content metadata peculiar to the network is UPnP CDS metadata.

14. A network system, comprising:

a first network apparatus comprising:

a metadata receiving unit which receives digital content metadata external to the network, which is TV-Anytime metadata;

a converter which converts the TV-Anytime metadata into digital content metadata peculiar to the network which is Universal Plug and Play (UPnP) Content Directory service (CDS) metadata using a predetermined rule by causing the TV-Anytime metadata received in the metadata receiving unit to be mapped into the UPnP metadata in a predetermined manner and by locating a Uniform Resource Locator (URL) using a Content Reference Identifier (CRID), which is a unique identifier pre-assigned to each program and is in a format of the TV-Anytime metadata and without further conversion into the UPnP metadata, identifies said URL, wherein said URL accesses a program in the TV-Anytime metadata, and wherein the URL is located after the TV-Anytime metadata is mapped into the UPnP metadata; and a storage unit which stores the converted TV-Anytime metadata therein to allow devices in the network to use the converted TV-Anytime metadata; and a second network apparatus comprising a processing module for analyzing and using metadata which has not been mapped into properties supported by classes of UPnP to an existing network among the TV-Anytime metadata mapped into the UPnP metadata, wherein the predetermined rule comprises:

a first conversion method in which TV-Anytime metadata is mapped into at least one of a movie class and a video class of UPnP CDS, and a second conversion method in which a class layer of the UPnP CDS is extended to include at least a portion of the TV-Anytime metadata by defining a new UPnP CDS class, and wherein the unconverted data is stored in a predetermined area of a memory.

15. A method for converting digital content metadata, comprising:

receiving digital content metadata external to a network, which is TV-Anytime metadata;

causing the TV-Anytime metadata to be mapped into digital content metadata peculiar to the network which is Universal Plug and Play (UPnP) Content Directory service (CDS) metadata according to a predetermined rule; and locating a Uniform Resource Locator (URL) using a content reference ID (CRID) in a format of the TV-Anytime metadata and without further conversion into the UPnP metadata identifies said URL, wherein said URL accesses a relevant content in the TV-Anytime metadata, and wherein the locating of the URL is performed after said causing, wherein the predetermined rule comprises:

a first conversion method in which TV-Anytime metadata is mapped into at least one of a movie class and a video class of UPnP CDS, and a second conversion method in which a class layer of the UPnP CDS is extended to include at least a portion of the TV-Anytime metadata by defining a new UPnP CDS class, and wherein the unconverted data is stored in a predetermined area of a memory.

16. A method for converting digital content metadata, comprising:

receiving TV-Anytime metadata;

causing the TV-Anytime metadata to be mapped into digital content metadata peculiar to the network which is Universal Plug and Play (UPnP) Content Directory service (CDS) metadata according to a predetermined rule;

locating a Uniform Resource Locator (URL) using a content reference ID (CRID) in a format of the TV-Anytime metadata and without further conversion into the UPnP metadata identifies said URL, wherein said URL accesses a relevant content in the received TV-Anytime metadata, and wherein the locating of the URL is performed after said causing; and storing the TV-Anytime metadata converted into the UPnP metadata on the basis of mapping information and the method of accessing the content, wherein the predetermined rule comprises:

a first conversion method in which TV-Anytime metadata is mapped into at least one of a movie class and a video class of UPnP CDS, and a second conversion method in which a class layer of the UPnP CDS is extended to include at least a portion of the TV-Anytime metadata by defining a new UPnP CDS class, and wherein the unconverted data is stored in a predetermined area of a memory.

17. The method as claimed in claim 16, further comprising setting a deletion condition for a part or all of the converted digital content metadata, and locating and deleting metadata satisfying the deletion condition from the converted external digital content metadata.

* * * * *